United States Patent [19]

Matosian

[11] Patent Number: 4,733,236

[45] Date of Patent: Mar. 22, 1988

[54] SPACE TARGET WITH MULTI-SPECTRAL ENERGY REFLECTIVITY

[75] Inventor: Kenneth R. Matosian, Los Altos, Calif.

[73] Assignee: The United States of America as represented by the Secretary of the Air Force, Washington, D.C.

[21] Appl. No.: 807,154

[22] Filed: Dec. 10, 1985

[51] Int. Cl.[4] .......... G01B 13/00

[52] U.S. Cl. .......... 342/7; 342/52; 342/169; 350/102

[58] Field of Search .......... 342/5, 7, 6, 52, 53, 342/169, 352

[56] References Cited

U.S. PATENT DOCUMENTS

| | | | |
|---|---|---|---|
| 1,878,909 | 9/1932 | Stimson . | |
| 2,520,008 | 8/1950 | King | 342/6 |
| 2,746,035 | 5/1956 | Norwood | 342/7 |
| 2,793,362 | 5/1957 | Oberg | 342/7 |
| 3,020,792 | 2/1962 | Kingsbury | 88/1 |
| 3,103,662 | 9/1963 | Gray et al. | 343/18 |
| 3,153,253 | 10/1964 | Chatelain | 343/18 |
| 3,158,862 | 11/1964 | Chisholm | 342/6 |
| 3,200,400 | 8/1965 | Gill, Jr. | 343/18 |
| 3,310,804 | 3/1967 | Brauer | 343/18 |
| 3,327,308 | 6/1967 | Henjum | 343/18 |
| 3,354,458 | 11/1967 | Rottmayer | 343/18 |
| 3,365,790 | 1/1968 | Brauer | 29/527 |
| 3,371,345 | 2/1968 | Lewis | 342/6 |
| 3,908,189 | 9/1975 | Buehler et al. | 342/6 |
| 4,148,033 | 4/1979 | Speckter | 342/7 |
| 4,176,355 | 11/1979 | Harris | 342/7 |
| 4,241,349 | 12/1980 | Connell | 342/7 |
| 4,531,128 | 7/1985 | Maja et al. | 342/7 |
| 4,551,726 | 11/1985 | Berg | 342/7 |

*Primary Examiner*—T. H. Tubbesing
*Assistant Examiner*—Mack Hellner
*Attorney, Agent, or Firm*—Gerald B. Hollins; Donald J. Singer

[57] ABSTRACT

A reflecting target device usable in space or on earth in the testing and simulation of weapons and other energy radiating space hardware. The disclosed embodiment includes an icosahedral reentrant cavity structure providing both infrared and radio-radar frequency retroreflective capability through the use of corner reflectors, conductive grid wires and coating layers. Launch-related apparatus are also described.

16 Claims, 8 Drawing Figures

Fig. 1
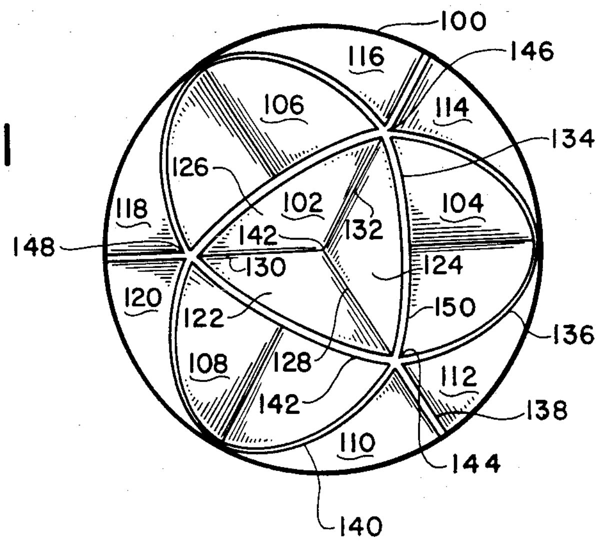
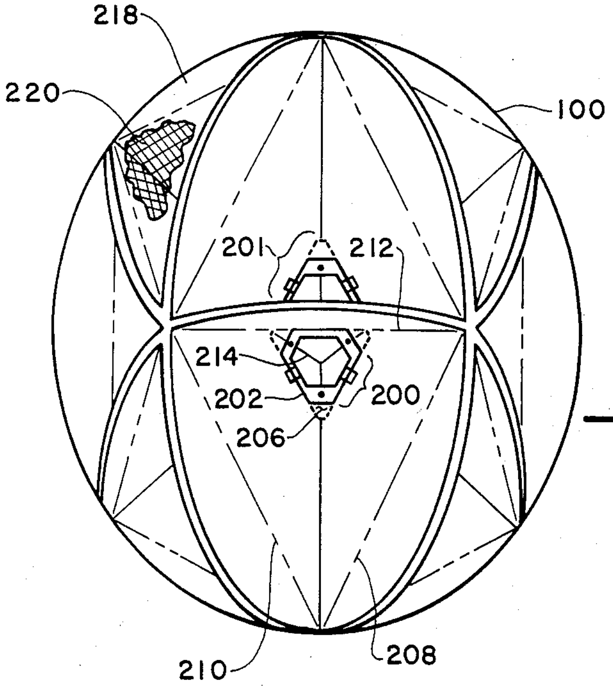
Fig. 2
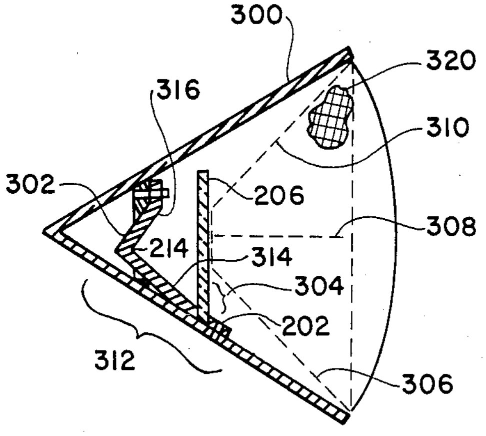
Fig. 3

SPACE TARGET WITH MULTI-SPECTRAL ENERGY REFLECTIVITY

RIGHTS OF THE GOVERNMENT

The invention described herein may be manufactured and used by or for the Government of the United States for all governmental purposes without the payment of any royalty.

BACKGROUND OF THE INVENTION

This invention relates to the field of energy reflecting devices of the type capable of reflecting incident electromagnetic energy residing in two or more segregated portions of the electromagnetic spectrum.

In order to simulate the appearance of a spacer satellite target during, for example, the testing or evaluation of a space weapon system, it is desirable to have a simulation target of known location and characteristics continuously available in space. For reasons of cost, reliability, and maintenance inaccessibility it is desirable for this simulated target to be physically rugged, simple in design, easily deployed and of sufficient mass to have a usably long space orbit life or good space kinematics. It is also, of course, desirable for such a simulated target to have thermal characteristics which make it relatively immune to solar radiation heating and weapon system heating that may be received from either friendly or hostile sources—for at least some minimum time interval. In addition to this thermal weapon immunity, it is also desirable for a simulation target to be as hardened against other forms of weapons, such as explosive devices, as is reasonably feasible—at least to the extent of being physically rugged and as simple as possible in concept. The desirability of achieving an attack-hardened target simulation device and the need for an appreciable target mass combine to diminish the capability of previously used inflated structures or balloon device targets for filling the present need.

The features of passive or energy reflecting nature in preference to an energy sourcing nature and the ability to respond to incident radiation energy in several portions of the electromagnetic spectrum are also desirably incorporated into such a simulation satellite target. Multi-spectral capability in such a target can, for example, permit radar coarse tracking and location of a target in addition to laser illumination and laser fine tracking during a final aiming or approach maneuver. The passive nature of such a satellite also desirably eliminates the need for on-board energy sources, electronic components and other complexities. The desired responsiveness to laser radiation also enables use of a simulated target with earth-situated high resolution precision tracking optical systems. For such laser tracking uses it is desirable for a satellite simulated target to provide a high degree of baffling or interference shielding between adjacent discrete reflecting locations in order that light wave interference effects between adjacent reflecting locations be minimized.

With regard to space orbit kinematics, it is of course desirable for a target simulation satellite to remain stable in either a fixed location or a predictable movement path for reasonable periods of time-in order that the cost of fabricating and disposing the satellite in space be spread over a large number of use events. Flexible launching capability such as the ability to employ left-over space in a plurality of different launch vehicles is of course a desirable feature for a simulated target device. The present-day American space program practice of reusing a launch vehicle, i.e., the advent of the space shuttle transport, offers a particularly attractive means for locating targets of this type in a selected orbital position. In particular, the presence of standard module launch apparatus in the space shuttle vehicle, i.e., the "get-away special" launch packages is well suited to space locating satellite devices or simple space targets (SST's) of this nature.

The patent are includes several examples of target devices capable of responding to electromagnetic radiation by returned signals and other response modes. Included in this art is the patent of E. R. Gill Jr., U.S. Pat. No. 3,200,400, which discloses a target capable of acting as a universal direction reversing device for both light and high-frequency electronics waves of the radar type. The Gill invention contemplates the use of sheet material having a mosaic pattern of triangular triple mirror faces in order to achieve universal energy direction reversal through a large variation of energy incidence angles. The reflecting surface in the Gill patent is a relatively thin layer of textured material.

The patent of E. F. Kingsbury, U.S. Pat. No. 3,020,792, describes an optical or radio wave apparatus for supplying, reflecting and detecting electromagnetic radiation—an apparatus that is especially intended for use in an object locating or distance measuring system. The Kingsbury apparatus also includes use of infrared spectrum radiation and a retrodirective reflector comprised of three perpendicular oriented mirrors. The source and receptor portions of the Kingsbury apparatus are shown to employ parabaloidal glass mirror members as energy reflectors. The retrodirective perpendicular mirror reflector arrangement in the Kingsbury patent is described principally as an optical device without the capabiliy for simultaneous reflections of radio frequency and optical spectrum energy.

The patent art also includes the concave polyhedral reflector structure of M. G. Chatelain, shown in U.S. Pat. No. 3,153,235. The Chatelain apparatus concerns a satellite reflector capable of returning incident radiant energy toward the energy source using a plurality of satellite reflecting points as opposed to the one single reflecting point relied upon in a conventional spherical reflector. The Chatelain apparatus also contemplates use of a closed skin surface that is inflated to become rigid. The Chatelain invention also supplements the dimpled reflector surface with a variety of adjacent geometric shapes.

Dimpled surface reflectors are also disclosed in a pair of patents issued to J. B. Brauer, U.S. Pat. Nos. 3,310,804 and 3,365,790, that are principally concerned with isotropic microwave reflection employing corner reflecting structures dispersed over the surface of a geometric shape, such as a sphere.

Corner cube reflector structures are also shown in a plurality of configurations and uses in a group of patents which are of principal interest as general background for the present invention; these patents include the signal lantern of J. C. Stimson, described in U.S. Pat. No. 1,878,909; the inflatable eight-corner reflector of T. E. H. Gray et al, in U.S. Pat. No. 3,103,662; the inflatable passive satellite framework of H. E. Henjum in U.S. Pat. No. 3,327,308; and the wire-film space satellite of E. Rottmayer in U.S. Pat. No. 3,354,458.

None of the above patents disclosed reflecting arrangements affording the advantages of dual spectrum capability, signal interference freedom, tangible satellite reflector mass and other advantages of the present invention.

SUMMARY OF THE INVENTION

An object of the present invention is to provide a dual spectrum capability reflecting apparatus suitable for use as a simulated target for space weapons.

Another object of the invention is to provide a space target device having an appreciable and useful mass—mass that contributes to achieving a desirable degree of orbital stability and weapon immunity for the target device.

Another object of the invention is to provide a retroreflective target arrangement, for use with lasers or other sources of optical energy, which is capable of minimizing wave interference in the reflected signals.

Another object of the invention is to provide a simulated target apparatus having good thermal conductivity properties within the target structure in order to achieve immunity to damage from radiant energy delivering weapons and solar energy radiation.

Another object of the invention is to provide a simulated target structure having improved energy reflecting capability over that of a simple geometric shape such as a sphere.

Another object of the invention is to provide a simulated target structure which is capable of being placed in earth orbit by a variety of launch vehicles.

Another object of the invention is to provide a simulated target apparatus compatible with the space shuttle transport and the "get-away special" space depolyment system.

Another object of the invention is to provide a satellite retroreflecting optical system which combines the benefits of a deep-seated reflector and lens elements.

Another object of the invention is to provide a simulated target apparatus of large mass which is capable of being fabricated from a variety of materials.

Another object of the invention is to provide a simulated target arrangement capable of achieving a range of reflecting characteristics through variation of the coatings employed on the target surfaces.

Another object of the invention is to provide a simulated target having useful signatures in the infrared, visible and radar spectral ranges.

These and other objects of the invention can be achieved by a multi-spectral reflective apparatus having electrical conductors of predetermined electrical resonant frequency determined dimensions forming an array of energy-reflecting cavity members, each array member incorporating a closed first end of small diameter and an open second end of larger diameter, the cavity members being disposed in three dimensions about a central point for forming a spherical body wherein the closed small cavity ends are located adjacent the central point, in the spherical body and the open larger diameter ends form the exterior of the spherical body and with optical retroreflecting means located in each cavity member for capturing optical energy directed toward the central point from an external source and for returning the captured energy in the direction of the external source.

BRIEF DESCRIPTION OF THE DRAWINGS

FIG. 1 is an overall view of a satellite simulated target constructed in accordance with the invention.

FIG. 2 is a more detailed view of a satellite simulated target showing features omitted in the FIG. 1 overall view.

FIG. 3 is a detailed cross-sectional view of one cavity from the FIG. 1 or FIG. 2 apparatus, showing yet additional details of the invention.

DETAILED DESCRIPTION

Figure 6:
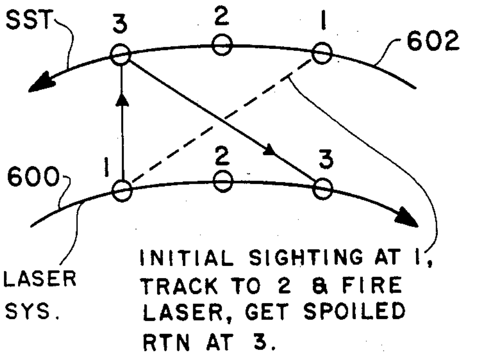
FIG. 6 is an aiming and timing example for signals communicating with a simple space target (SST) device.

FIG. 1 of the drawings shows a twenty-sided or icosahedral spherical polyhedron embodiment of a simulated target reflecting apparatus suitable for either space deployment or earth-situated uses. The FIG. 1 apparatus represents a passive reflector type of simulated target usable with radiation source of multiple energy spectrum capability. Space use of the FIG. 1 apparatus may involve either an earth orbit of the synchronous or moving position type or a deep space location, while an earth-situated use might be arranged by mounting the FIG. 1 structure from tensile wires or on a supporting tower.

In FIG. 1 the simulated target 100 is shown to include a plurality of barrier or divider member surfaces 122, 124 and 126 which meet at a plurality of intersecting lines 128, 130 and 132 to form twenty pyramidal shaped reentrant cavities, one of which is indicated at 102. Nine additional of the twenty reentrant cavities forming the FIG. 1 structure are visible at 104, 106, 108, 110, 112, 114, 116, 118, and 120 in FIG. 1 with the additional ten such cavities being located on the back or non-shown side of the FIG. 1 structure.

The lines of intersection forming each of the cavities in FIG. 1, such as the cavity 102, meet at a central point 142 which is located adjacent the center of the spherically shaped target 100. Another way of viewing the FIG. 1 structure is to consider the cavities 102-120 to be dispersed in three dimensions about the point 142, the point 142 being therefore the center of the spherical structure. As indicated in FIG. 1, the surfaces forming each of the cavities are actually part of planar members having the finite thickness indicated at 134, 136, 138 and 140 in FIG. 1. These planar members of finite thickness meet in a plurality of junctions 144, 146 and 148 which extend radially from the central point or center 142 to the periphery of outline of the simulated target 100.

The term "reentrant cavity" can be used in describing the FIG. 1 apparatus considering that a reentrant angle is defined in Webster's unabridged Third Edition dictionary, 1960, as "an angle pointing inward or an angle in a line of troops or fortifications with its apex turned away from the enemy". A "reentrant angle" in a closed polygon is further defined as "any exterior angle less than 180° in this same dictionary.

In speaking of the FIG. 1 target it is also convenient to use the term "diameter" when referring to the spherical structure defined by the edges of the barrier or divider members 112–126 etc. One such edge, for the divider member 124, is indicated at 150 in FIG. 1. Alternately, a diameter of the FIG. 1 structure may be considered as the distance across the circular silhouette formed when parallel light rays impinging on the FIG. 1 target are received on a screen oriented perpendicular to the light rays. In describing the cavities such as the cavity 102, moreover, it is convenient to speak of a cavity diameter even though as shown in FIG. 1 the cavities are pyramidal rather than circular or conical in shape. The apex adjacent diameter of the cavity 102 in FIG. 1 would, of course, be near zero while the exterior most diameter of this cavity might be considered to be the diameter of the target circle touching each of the barrier divider member surfaces 122–126 at the outermost edge midpoints. With embodiments of the invention employing pyramidal cavities having more than three barrier or divider member surfaces each, i.e., pyramids of 4, 5, or 6 sides each, the configuration of the pyramid base becomes more circle-like in nature and the term "diameter" is increasingly appropriate.

In the showing of the cavity 102 in FIG. 1, the cavity region near the pyramid apex or the spherical center 142 is shown in simplified or representative form for the sake of drawing clarity and for easy overall description of the FIG. 1 structure. As indicated in FIGS. 2 and 3, however, the invention in reality contemplates the incorporation of a structure capable of improved energy reflection in this apex region. FIG. 2 of the drawings represents a slightly enlarged and rotated view of the FIG. 1 structure, while FIG. 3 is a cross-sectional view of one cavity of the FIG. 1 structure such as the cavity 102. Frontal and frontal-oblique views of the cavity apex energy reflecting structure are shown in FIG. 2 of the drawings at 200 and 201, respectively. The cavity apex energy reflecting structure is also indicated at 312 in FIG. 3. A second form of energy reflecting structure is also shown in the FIG. 2 and FIG. 3 drawings, this structure is indicated by the triangular areas 208, 210 and 212 in FIG. 2 and the triangular areas 306, 308 and 310 in FIG. 3, and is described in detail below.

The energy reflecting structure indicated at 200, 201, and 312 in FIGS. 2 and 3 is tailorable to be responsive to optical energy residing in the infrared and/or visible portions of the electromagnetic spectrum. This structure includes a lens 206 of the planar type which is mounted by a lens retaining member 202. The lens 206 is shown in phantom or dotted form in FIG. 2 to enhance the clarity of the FIG. 2 drawing, the lens actually overlays or hides most of the other apex structure shown in FIG. 2 in an actual embodiment of the apparatus. The lens 206 could be of the conventional convex or plano-convex type, but is preferably a planar or fresnel type lens.

By way of explanation, the lens can be made of glass, quartz, calcium fluoride, sapphire or other infrared transmitting materials. The lens 206 serves as a spoiler lens for the retroreflector 302 and is employed in order that the space target device be capable of returning a portion of the received optical energy to the point of energy transmission despite space velocity movement of the target device in its orbit during the energy propagation time. Except for the presence of such a spoiling lens, the energy propagation time between optical signal transmission and reception would cause the energy reflected by the retroreflector 312 to return to a point slightly removed from the energy transmission point—in space or on the earth. This concept is illustrated in the example below. The amount of spoiling needed from the lens 206 is relatively small in optical terms; a plano-convex lens of 500 meters focal length or an optical device that departs only slightly from having two parallel optical surfaces is adequate for achieving the required spoiling. Spoiling, of course, decreases the amount of energy returned to the optical receiver since the available retroreflector energy is spread over a larger spherical angle or a larger area at the receiver plane. The signal levels achievable with the presently described apparatus are sufficient to accept this signal decrease, however.

OPTICAL SPOILING EXAMPLE

The lens of the discloses SST compensates for the "slowness" of the speed of light (c) and the high relative velocity (v) between the SST and the laser system. FIG. 6 in the drawings illustrates this concept: at the points 1, the laser system moving in the path 6000 on earth, for example, sees the SST in the orbit path 602 and tracks it; at the point 2, the laser system fires its laser to the location where the SST will be when the radiation can reach it (the laser points ahead), taking into consideration the range (R), v, and c; at the point 3, the laser beam irradiates the SST (and, therefore the retroreflector and spoiling lens) and is spoiled to an angle which compensates for R, v, and c and assures that retroreflected energy is sensed by the optical receiver system.

The time it takes for the laser beam to travel from the system to the SST can be calculated as follows. It is known that:

$$S = V \times t$$

where $S$ = distance, assume for example 500 km $= 5 \times 10^5$ m $V$ = velocity or light $= c = 3 \times 10^8$ m/s $t$ = time, seconds Therefore, $$t = 2S/c = 2(5 \times 10^5)\text{m}/3 \times 10^8 \text{ m/s} = 3.33 \times 10^{-3} \text{ seconds(for up and down)}$$

If, for example, the relative velocity between the laser system and the SST (u) were 1,500 m/s ($1.5\times10^3$ m/s) and the laser system fired "directly at where it saw the SSST", as opposed to pointing ahead, it would miss the SST by:

$$1 = \text{miss distance} = v \times t = 1.5 \times 10^3 \text{ m/s} \times 3.33 \times 10^{-3} \text{ s} = 5 \text{ m} = 16.4 \text{ feet}$$

Therefore the needed amount of optical spoiling is dependent on the constant c and variables R and v.

The area of the retroreflector can also enter into these considerations, since if the area of the "diameter" of the retroreflector is small as compared to the wavelength of the radiation then Fraunhofer (rather than Fresnel) diffraction effects can result and can produce adequate spoiling of the return beam without a spoiling lens.

Continuing now with the structure shown in FIGS. 2 and 3, the lens retaining member 202 and lens 206 are indicated generally in cross-sectional form at 304 in FIG. 3. Behind the lens 206, in FIG. 3 is located on optical retroreflector structure 302 of the three perpendicular reflecting surface or open cube corner or spoiled cube corner type. Retroreflectors of this type are known in the art and are also described in the above-mentioned U.S. Pat. No. 3,020,792, which is hereby incorporated by reference. Retroreflectors of this type have the capability of returning incident optical radiation along the path of radiation incidence by way of reflection between the three reflecting surfaces.

The angular separation between reflecting surfaces of a cube corner retroreflector is of course, somewhat critical as is known in the optical art—in order to achieve the desired retroreflector action with minimal divergence of the incident and reflected energy paths. Use of the separate retroreflector structure 302 in the present apparatus in lieu of attempting to use the cavity walls as elements of a retroreflector (assuming, of course, appropriate cavity shape) provides a significant relaxation in the fabrication tolerance requirements for the cavities such as the cavity 102 in the FIG. 1 structure. An arrangement of the FIG. 1 structure which required the holding of optical dimension tolerances during brazing or welding of the cavity wall junctions would be prohibitively expensive, if not technically unfeasible.

Figure 8:
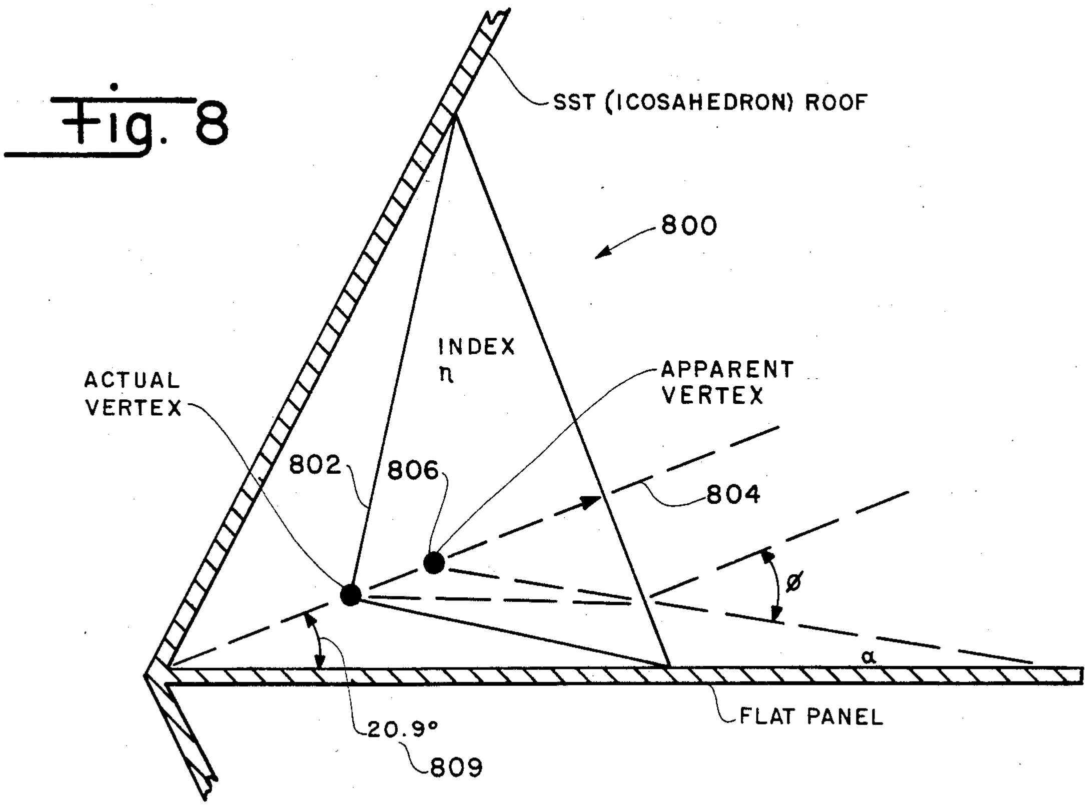
FIG. 8 shows optical path details for the energy reflected from a pyramidal cavity containing a retroreflector element.

FIG. 8 in the drawings shows additional details of the optical reflection characteristics of an icosahedral pyramidal cavity 800 having a retroreflector 802 located near the cavity apex. The reflected energy return path 804 in this cavity arrangement are shown to pass through the apparent vertex point 806 lcoated at a non-central angle with respect to one side of the cavity.

The lines 208, 210 and 212 in FIG. 2, along with the similarly disposed but non-numbered lines within the adjacent cavities of the FIG. 2 structure represent the exterior boundaries of a wire grid conductor structure that is used to enhance or augment the radio-radar frequency energy reflectivity of the FIGS. 1, 2, and 3 cavities. Representations of this wire grid structure are shown at 220 in the cavity 218 in FIG. 2 and at 320 in the FIG. 3 cavity. Wire grid structures of this type are preferably use to substantially cover the walls of each cavity of the space target, the illustrated partial coverings are shown for the purpose of drawing simplicity and clarity herein. The preferred bounds of the wire grid coverings also illustrated by the lines 306, 308 and 310 in the FIG. 3 drawing.

The wire grid structure at 220 and 320 is preferably fabricated from a metal of high conductivity such as gold, silver, or copper, the grid structure can be punched from solid sheet material or woven from individual wire conductors that are connected by soldering, brazing, or the like at the conductor intersections. In a similar fashion the abutting edges of the wire grid structure at the corners or intercepts of the grid planar surfaces can also be soldered, brazed, or similarly connected in order to achieve good electrical conductivity and structural integrity.

Figure 7:
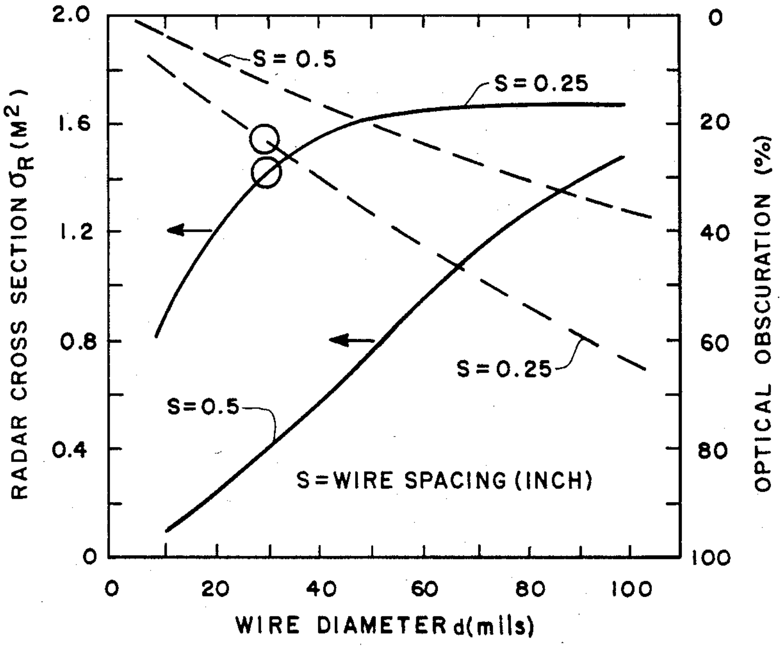
FIG. 7 is a graph relating optical and electrical signal reflection characteristics with wire grid dimensions.

The spacing and diameter of the conductors forming the wire grid structure 220 and 320 is a matter of some compromise—close spacing of large conductors is desirable for good radio frequency energy reflection characteristics, while distant spacing of small conductors is desirable for the transmission of optical energy to and from the retroreflector 302 and the cavity walls. Preferably therefore as a compromise, the wire grid structure is fabricated from wire of 30 mils diameter located on 0.25 inch centers with an edge length of about 18.59 centimeters and results in optical-geometric obscuration in the range of twenty-five percent for the SST; FIG. 7 in the drawings illustrates graphically the relationships expected between wire diameter, radar cross-section, optical obscuration and wire spacing and thereby allows tailoring of these parameters in other embodiments of the invention.

The enhancement of signal return achieved by the wire grid structure can be appreciated by comparison with the reflecting capability of a spherical reflector; such enhancement can be expressed in terms of the FIG. 7 described radar cross-section of a reflector. A large sphere of radius a, for example, where $a/\lambda$ is greater than 1, has a radar cross-section $\sigma$ of numeric value $\pi a^2$; $\sigma$ for a 50 cm diameter sphere is therefore equal to about 0.2 meters$^2$.

In comparison with a sphere reflector, a wire grid cube corner with a maximum cord length of 1, and a total three surface reflectivity of $\rho^3$ provides a radar cross-section $\sigma$ that can be calculated from the relationship $4/3\ \pi l^4 \rho^3/\lambda^2$, where $\lambda$ is the incident signal wavelength. $\sigma$ for a 50 cm diameter cavity structure of the type shown in FIGS. 1–3 is, from this relationship, 2 meters$^2$ or more—an order of magnitude improvement over a spherical surface of equal size.

The FIGS. 2 and 3 reflector structure is generally consistent with the preferred practice of using C-band radar of frequency 5.5 GHz and 5.5 cm wavelength for space tracking operations. Other radar frequencies are usable for space tracking with some reduction in signal response properties. The sloping sides of the FIGS. 1–3 indicated pyramidal cavity wire grid structures allow adaptation of signal current path length to different radar frequencies; that is, the cavity structure is not configured for sharp resonance at C band or other radar frequencies, but is capable of reflecting energy over a wide band of radar frequencies. The radar return from a target of the FIGS. 1 and 2 type is continuous and speckled in nature.

In practice, it is desirable for the effective radar cross-sections of a simulation space target to be at least one meter squared—in order that sufficient signal return be achieved for a good tracking performance over reasonable distances and in order that accurate ephemeris data from Leo satellite space tracking be achieved. The previously outlined calculations indicate that the FIGS. 1–3 structure meets this minimum cross-section requirement.

Returning now to the infrared reflecting or infrared signature characteristics of the FIGS. 1–3 structure. It is desirable to provide the surfaces of each reflecting cavity, that is, the surfaces 122, 124 and 126, for the cavity 1220 and the similar surfaces in each of the other cavities of the SST, with an infrared reflecting coating in order to increase the magnitude of the reflected optical signal from that which would be provided by the retroreflector 302 and the lens 206 alone—that, is useful optical reflection can be accomplished from the cavity walls in supplement to the reflection accomplished from the retroreflector. This concept is, of course, implied from the FIG. 7 concern with optical obscuration by the wire grid structure. In addition, it is also desirable to coat the reflecting surfaces of the retroreflector 302 in FIG. 3 with an infrared enhancing coating. Several coatings suitable for this use are known in the art including black chrome. With coatings of this type, an effective solar absorptivity of 0.9 is achievable, along with an effective infrared emissivity of 0.4 and a diffuse reflectivity at a wavelength of 0.53 micrometers of 0.1. Variations in the black chrome or other material coating allow the achievement of a wide range of values for solar absorptivity, infrared emissivity and diffuse reflectivity.

With respect to the infrared reflectivity characteristics of the FIGS. 1–3 apparatus, the described arrangement provides an effective infrared aperture fo 42.4 $cm^2$, that is, a hexagon shape with flat dimensions of 7.0 cm, a beam spoiling angle of 100 microradians, and a spoiling angle to infrared wavelength ratio equivalent to that of a simple lens absorbing device.

The above description and characteristics presume that a combination of radar frequency energy and infrared spectrum energy are desired for use with the FIGS. 1–3 apparatus; that is, infrared tracking of the FIGS. 1–3 target would be achieved through use of a laser having an infrared-rich spectral output—such as a carbon dioxide gas laser or, in lower energy short distance uses, a solid state laser device. Where optical reflectance in the visible part of the spectrum is of greater importance than infrared reflecting characteristics, the surfaces recited above as candidates for black chrome coating may be made in the form of polished or silvered mirror surfaces or may be coated with a white or colored material. Where target tracking with ultraviolet spectrum energy is to be employed, surfaces of other materials known in the optical art may also be employed.

As mentioned at the outset of the present description, the FIGS. 1–3 apparatus when used in space, will be subjected to a plurality of optical energy forms including solar radiation, tracking radiation, and weapon system attack radiation. In many instances the ability of the described structure to conduct heat away from an area of radiant energy impingement and thereby maintain a substantially uniform temperature throughout the SST structure becomes important for both target survival and for infrared signature stability considerations. The high thermal conductivity of the preferred copper or aluminum materials for fabricating the FIGS. 1 and 2 structure contribute to this ability to maintain uniform temperature.

The mechanism for temperature maintenance in the FIGS. 1–3 apparatus includes the inherent absorption of a certain fraction of the incident radiation, elevation of the local structure temperature as a result of this absorption, conduction of the absorbed energy to a cooler portion of the structure, and dissipation of the absorbed energy by radiation into free space. Such free space radiation occurs principally from the dark and non-radiated portions of the FIGS. 1–3 structure—portions which will usually be located on the side opposite the point of radiant energy impingement or intermediate the points of impingement associated with plural radiant energy sources. An operating temperature range of 333°–345° K. (60°–72° C.) is contemplated for the described embodiment of the invention in the presence of outer space solar radiation; such a temperature is, of course, easily within the capability of the recited construction materials. Temperatures exceeding this range are to be expected in the event of weapon radiation.

The nature of the FIGS. 1–3 apparatus in locating the retro-reflective cube corner as deeply as possible within the FIGS. 1–3 structure affords a desirable reduction in the occurrence of light wave interference effects that could result from a superposition of retroreflections from multiple cavity cube corners. These interference effects, as would be present in the shallow surface reflecting structures described in some of the above identified patents, would diminish the stability, coherence and signal strength of a reflected optical signal and are therefore undesirable.

A target device of the type shown in FIGS. 1–3 can be employed in earth-situated uses such as by mounting the target on the top of a tower for use in the developmental testing of space weapons. Use of a device of the disclosed type is principally contemplated in earth orbit or other space applications, however. The FIGS. 1–3 embodiment of the invention therefore includes consideration of the launching requirements attending targets of this type, these considerations are described in connection with FIGS. 4 and 5 of the drawings.

Figure 4:
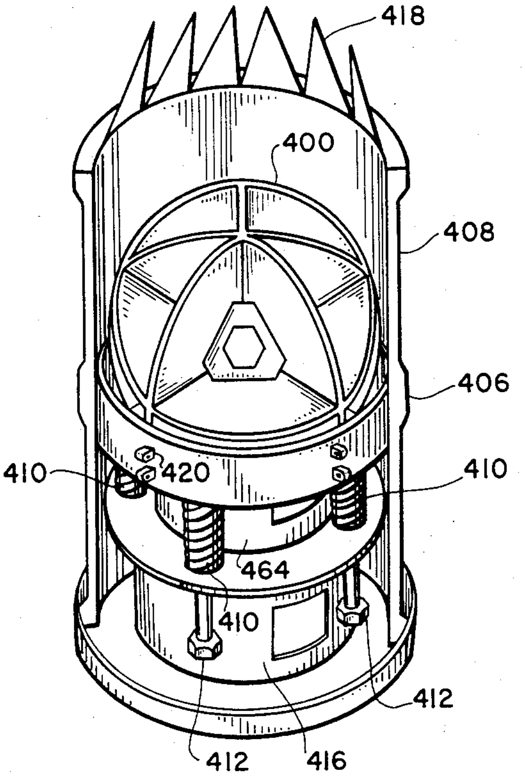
FIG. 4 shows a simulated target apparatus of the FIG. 1 and FIG. 2 type contained within a carrying and launching container.

A target of the FIGS. 1–3 type is shown at 400 in FIG. 4 to be contained within a cannister 406 of the variety which might be employed to carry a target into an orbit adjacent position. Cannisters of the type shown in FIG. 4 include a body of lightweight but substantial cross section, as shown at 408, an ejecting mechanism represented by the springs 410, and the limiting bolts 412, and additional and larger launch force springs which are not shown, together with control apparatus contained within the chambers 414 and 416. The cannister 406 also includes a segmented vented and rupturable cover 418 and cannister mounting ears as indicated at 420.

Figure 5:
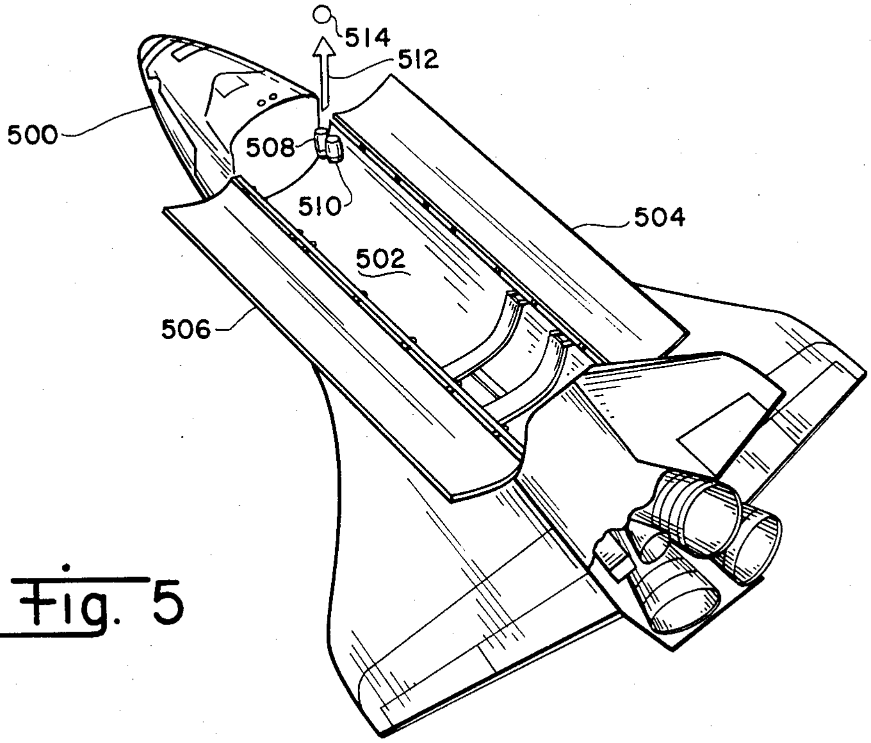
FIG. 5 shows the arrangement of a FIG. 4 type launch apparatus in a space shuttle transport vehicle.

Although a cannister of the type shown in FIG. 4 or other suitable containers may be used for carrying the target of the present invention into near final position aboard any type of space vehicle, the currently used United States NASA space shuttle transport affords a convenient and reasonably low-cost means for achieving this transportation. A representation of a space shuttle transport is shown at 500 in FIG. 5 of the drawings; this view includes a representation of the shuttle cargo bay 502, the cargo bay cover doors 504 and 506, and a pair of cannisters of the type shown in FIG. 4, at 508 an 510. The cannisters 508 and 510 are shown mounted in one end of the cargo bay where escape of the satellite target as indicated by the arrow 512 is easily achieved. The SST 514 in FIG. 5 is preferably arranged to have a rearward directed ejection velocity near 2 meters per second with a spin rate less than 1 revolution per minute. The satellite can be araranged for deployment upon command from a payload specialist in the satellite crew compartment of the space shuttle transport vehicle. The cannister arrangement shown in FIGS. 4 and 5 has been given the name "get-away special" in the language of the space shuttle transport designers and users. Other launching arrangements are, of course, within the spirit of the invention.

For fabricating the FIGS. 1–3 structure, electrically and thermally conductive materials such as copper or aluminum plate are preferred. The individual barrier or divider members 122, 124 and 126 when fabricated from such material may be positioned in a jig or otherwise held in rigid position for welding, brazing, or soldering or while other attachment arrangements as are known in the art are performed along the lines 128, 130 and 132.

In an embodiment of the FIG. 1 apparatus wherein 0.7 cm thick copper plate is employed for the barrier divider members, and a 50 cm diameter spherical structure is constructed, the resulting overall structure has a total weight near 86 kg or 189 lbs. A structure of this mass is desirable for space use, since changes in an attained orbit resulting from collisions with space dust or micrometeoroid particles are much slower to affect the velocity and orbit of a structure of this mass than would be the case if plastics or inflatable structure or other low-mass alternatives were employed in fabricating the simulation target.

The FIGS. 1–3 simulated target arrangement provides desirable on-orbit thermal characteristics, a reasonably large infrared signature, and useful mass-dependent orbital lifetimes. The preferred embodiment also affords uniform thermal distribution within the target structure while in orbit. The described icosahedral or twenty-sided arrangement of the invention additionally provides a desirable numer of opto-retroreflectors within view of a tracking or locating laser source while also limiting the degree of optical interference realized between adjacent reflecting areas.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Multispectral energy responsive space satellite reflecting apparatus comprising:

a rigid spherical polyhedron incorporating a plurality of adjacent reentrant pyramidal cavities formed by intersecting planar divider members each common to two adjacent cavities and intersecting at pyramid apices located at the center of said spherical polyhedron;

a plurality of optical reflector members located one in the apex adjacent portion of each said pyramidal cavity in physical separation from the cavity apex and capable of outwardly reflecting optical energy directed into said cavity from an external source; and a plurality of radio frequency energy reflector members located one in each said pyramidal cavity and disposed over a portion of the interior surface thereof and capable of conducting and reflecting radio frequency energy received from an external source.

2. The satellie reflecting apparatus of claim 1 wherein said divider members are comprised of copper and said apparatus has a weight exceeding fifty kilograms.

3. The satellite reflecting apparatus of claim 1 wherein said divider members are comprised of aluminum.

4. The satellite reflecting apparatus of claim 1 wherein said divider members include an infrared energy spectrum reflecting surface layer.

5. The satellite reflecting apparatus of claim 4 wherein said reflecting surface layer is comprised of black chrome.

6. The satellite reflecting apparatus of claim 1 wherein said optical reflecting members each include a spoiled cube corner retroreflector element.

7. The satellite reflecting aparatus of claim 1 further including space shuttle transport launching means for housing said reflecting apparatus during earth launch and for thrusting said reflecting apparatus into space.

8. The satellite reflecting apparatus of claim 1 wherein said satellite reflecting apparatus includes twenty of said pyramidal cavities.

9. The satellite reflecting apparatus of claim 1 further including an optical spoiling lens member located in each said pyramidal cavity between said apex and the exterior periphery of said polyhedron.

10. Multispectral reflective apparatus comprising:

means forming a plurality of cavity members having a clsoed first end of small diameter and an open second end of larger diameter, said cavity members being disposed in three dimensions about a central point for forming uniform a spherical body wherein the closed small cavity ends are located adjacent said central point in the spherical body and said open larger diameter ends form uniform the exterior of said spherical body; and optical retroreflecting means located in each said cavity member adjacent said central point but segregated therefrom for capturing optical energy directed toward said cavity from an external source and for returning said captured energy in the direction of said external source; and radio frequency energy reflecting means located in each of said cavity members adjacent said retroreflecting means for capturing and reflecting radio frequency energy directed toward said reflective apparatus.

11. The reflective apparatus of claim 10 wherein said cavity members are three-sided pyramidal cavities.

12. The reflecting apparatus of claim 11 wherein said retroreflective means includes an optical cube corner member disposed in said pyramidal cavity adjacent the pyramidal cavity apex.

13. The reflective apparatus of claim 12 further including an infrared energy reflecting coating disposed over said optical retroreflecting cube corner member;

whereby energy reflection in the infrared, visible and radio frequency spectral range is provided by said reflective apparatus.

14. Large mass high thermal conductivity space satellite retroreflection apparatus for returning radio frequency and optical spectrum energy signals along paths parallel disposed of the incidence paths thereof and comprising the combination of:

a rigid spherical polyhedron structure having a uniform plurality of adjacent reentrant pyramidal cavities of closed apex end and open outward facing apex opposite end, said cavities being formed by intersecting radially disposed planar polyhedron divider members each common to two adjacent cavities and intersecting in co-planar cavity corner lines which have the apex points located along individual cavity lines adjacent the structure center, said polyhedron structure being comprised of homogeneous heat conducting planar metal material and covered within said cavities by an optically reflective coating layer;

a plurality of cube corner retroreflector members, one for predetermined of said cavities and disposed deep within said cavities adjacent said cavity apices;

a plurality of optical lens members, one for each predetermined of said cavities and disposed each within a cavity and intermediate said retroreflector member and said open, apex opposite, cavity end; and microwave energy reflecting means located also in each of said cavity members and disposed over the interior cavity surface thereof for reflecting microwave radio frequency energy received from a remote microwave source back along the incidence path thereof.

15. The apparatus of claim 14 wherein said optical spectrum energy is infrared energy and wherein said optically reflective coating layer is comprised of black chrome material.

16. The apparatus of claim 14 wherein said optical lens members are planar fresnel lenses.

* * * * *

UNITED STATES PATENT AND TRADEMARK OFFICE

CERTIFICATE OF CORRECTION

PATENT NO. : 4,733,236

DATED : March 22, 1988

INVENTOR(S) : Kenneth R. Matosian

It is certified that error appears in the above-identified patent and that said Letters Patent is hereby corrected as shown below:

Col 1, line 16, "spacer" should be --space--.

Col 2, line 10, "are" should be --art--.

Col 2, line 30, "perpendicular" should be --perpendicularly--.

Col 2, line 36, "reflections" should be --reflection--.

Col 2, line 66, "disclosed" should be --disclose--.

Col 4, line 27, "source" should be --sources--.

Col 4, line 57, "of" should be --or--. (1st occurrence)

Col 4, line 66, after the word "target" should be a ",".

Col 5, line 1, "112-126" should be --122-126--.

Col 6, line 20, "6000" should be --600--.

Col 7, line 27, "lcoated" should be --located--.

Col 7, line 38, "use" should be --used--.

UNITED STATES PATENT AND TRADEMARK OFFICE
CERTIFICATE OF CORRECTION

PATENT NO. : 4,733,236

DATED : March 22, 1988

INVENTOR(S) : Kenneth R. Matosian

It is certified that error appears in the above-identified patent and that said Letters Patent is hereby corrected as shown below:

Col 8, line 53, "that, is" should be --that is,--.

Col 9, line 5, "fo" should be --of--.

Col 9, line 61, "retro-reflective" should be --retroreflective--.

Col 10, line 43, "araranged" should be --arranged--.

Col 11, line 68, claim 10, line 3, "clsoed" should be --closed--.

Col 12, line 3, claim 10, line 6, "forming uniform a" should read --forming a uniform--.

Col 12, lines 6-7, claim 10, lines 9-10, "form uniform the" should read --form the uniform--.

Col 12, line 29, claim 13, line 5, "range" should be --ranges--.

Signed and Sealed this

Ninth Day of August, 1988

*Attest:*

DONALD J. QUIGG

*Attesting Officer* *Commissioner of Patents and Trademarks*